United States Patent [19]

Bates

[11] 3,929,398
[45] Dec. 30, 1975

[54] HIGH SPEED OPTICAL WAVELENGTH DETECTION SYSTEM

[75] Inventor: Harry E. Bates, Orlando, Fla.

[73] Assignee: Martin Marietta Corporation, Orlando, Fla.

[22] Filed: Aug. 18, 1971

[21] Appl. No.: 172,797

[52] U.S. Cl. .............. 356/186; 250/226; 340/347 P
[51] Int. Cl. ............................................. G01j 3/48
[58] Field of Search ......... 356/74, 79, 82, 173, 178, 356/186, 195, 174, 225, 226, 152, 168; 340/347 P; 250/220 M, 203 R, 226

[56] References Cited
UNITED STATES PATENTS

| 2,734,418 | 2/1956 | Enns | 356/82 |
| 2,807,799 | 9/1957 | Rosenthal | 356/74 |
| 3,100,264 | 8/1963 | Jaffe et al. | 250/203 R |
| 3,196,431 | 7/1965 | Papelian | 340/347 P |
| 3,541,572 | 11/1970 | Shults | 340/347 P |
| 3,555,285 | 1/1971 | Irving | 250/220 M |

OTHER PUBLICATIONS

Reynolds, "Color Sensitive Light Pen," IBM Tech. Disc. Bull., Vol. 12, No. 11, 4–1970, 356–374.

Primary Examiner—Maynard R. Wilbur
Assistant Examiner—S. C. Buczinski
Attorney, Agent, or Firm—Julian C. Renfro; Gay Chin

[57] ABSTRACT

Light whose wavelength is to be measured is applied to a device utilizing a light processing means which serves to transmit light to a detector array in a manner determined by its wavelength. The coded output of the detector array can thus immediately indicate the wavelength of the incoming light. I prefer to utilize a wedge interference filter to produce a line of light extending across the width of the filter at a position along its length, which position is a function of the wavelength. The position of the line of light is encoded by a binary code mask to digitally indicate the light wavelength. Indicator lamps are activated in accordance with the digital indication and are rendered responsive to the light from the code mask in response to a high sensitivity detector. The system broadly includes apparatus for measuring a light signal in which a plurality of signal transmission paths whose transfer functions are different functions of light wavelength effect transmission of the light signal to a unique combination of the output channels responsive to a specific input wavelength.

22 Claims, 11 Drawing Figures

INVENTOR
HARRY E. BATES

BY Julian C. Renfro

INVENTOR
HARRY E. BATES

BY *Julian C. Renfro*

ATTORNEY

HIGH SPEED OPTICAL WAVELENGTH DETECTION SYSTEM

The present invention relates to an apparatus for measuring or analyzing a physical characteristic of a signal, such as may involve electromagnetic radiation, and, more particularly, to a device for determining the wavelength of light from a laser or other narrowband source. In the present specification, the term "light" will be used as a generic term to include any electromagnetic radiation whose wavelength is to be measured, and is not intended to be limited to the visible spectrum.

BACKGROUND OF THE INVENTION

There has been a need for a wavelength detecting and measuring device which is capable of providing an immediate and easily interpreted readout. For example, in laser countermeasure systems, there is a need for such a device which is simple and adapted to be hand-held. Moreover, in such an application or utilization, it is highly desirable that the device be capable of responding to and measuring the wavelength of even a single, very short pulse of laser light, such as monochromatic laser light.

Prior art techniques for measuring wavelength have generally relied upon signal processing techniques, e.g., analog techniques, which have required a relatively high signal-to-noise ratio. Such prior art techniques for measuring wavelength have included scanning monochrometers, detector arrays in combination with narrow band filters, Fourier spectrometers, spectrometers with detector arrays in the image plane, and combinations of detectors and tailored filters with analog data processing. None of these techniques has provided a simple device capable of measuring a single, short pulse of light with good sensitivity over a reasonable wavelength band with a minimum number of sensing elements.

SUMMARY OF THIS INVENTION

In accordance with the present invention, I have provided a new and improved system for measuring a wavelength of light which falls within a given bandwidth, the light being transmitted to N output channels by paths having different periodic transmission characteristics such that the paths discriminate between wavelengths falling within predetermined subdivisions of the bandwidth. In other words, the wavelengths falling within different subdivisions of the bandwidth are transmitted to different combinations of the output channels.

In accordance with the invention, the signal whose characteristic is to be measured is applied to a signal-transmitting means which has a plurality of output channels to which the input signal is transmitted in combinations dependent upon the characteristic of the signal, i.e., light, to be measured. The signal transmitting means has resolution elements whose signal-transmitting characteristics depend upon the characteristic of the input signal to be measured so that the combination of signals appearing on the output channels indicates the magnitude of the characteristic to be measured. In the specific form of the preferred embodiment, an input light signal whose wavelength is to be measured is processed by means including an interference wedge filter to provide a line of light at a position which is dependent on the wavelength of the input light signal. Further processing involves the blocking or the transmitting of what may be regarded as various portions or increments of the line of light, accomplished by a binary position encoding mask whose output is to a plurality of output detectors, which in turn serve to digitally indicate wavelength.

It is therefore one object of the present invention to provide a new and improved wavelength measuring device which is simple in construction but yet has high sensitivity, is capable of good resolution, and preferably provides a digital readout.

Another object of the present invention is to provide a device which is capable of reliably measuring the wavelength of a short, single pulse of light, e.g., a pulse of laser light, over a reasonable wavelength interval.

It is another object of this invention to provide such a device which is constructed and arranged so as to require a minimum number of detectors.

Still further, it is an object of this invention to provide such a device in which an immediate and easily interpreted readout is obtained.

It is also an object of this invention to provide such a device which digitally processes the signal, thus requiring a relatively low signal-to-noise ratio.

It is further an object of the present invention to provide a new and improved wavelength measuring device which is of simple, rugged construction involving no moving parts and which may be constructed so that it can be hand-held.

A further object of the present invention is to provide a new and improved wavelength detector which utilizes a plurality of output channels. Light whose wavelength is to be determined is transmitted by elements whose transmissibility depends on wavelength so that light beams of different wavelength are transmitted to different combinations of these output channels.

The invention still further provides a new and improved wavelength measuring system in which a direct digital readout is obtained by viewing light exiting from a dispersive device through a binary position encoding mask to encode the location at which the light exits from the device to provide a binary number which indicates the location and, in turn, the wavelength of the light.

It is yet another object of the present invention to provide a new and improved apparatus for measuring the wavelength of light in which the presence of a light input to be measured is detected by a highly sensitive detection device which then renders the apparatus effective to digitally indicate the wavelength of the light received.

Further objects, features and advantages of the present invention will be apparent from the following detailed description of a preferred embodiment made with reference to the accompanying drawings in which.

In accordance with the present invention, the light signal whose characteristic is to be measured is detected and processed by signal-transmitting means for transmitting the signal to a plurality of different output detectors to provide a resolution of $2^N-1$ where N is the number of output detectors. Each signal is selectively transmitted or blocked from the detectors by transmission paths which transmit or block the signal as a periodic function of the characteristic to be measured. In the preferred embodiment for measuring the wavelength of light, monochromatic light from a laser within a given bandwidth passes through an entrance aperture and is transmitted through an optical wedge interference filter at a specific position along the length of the filter which is dependent on the wavelength of the light. This provides a line of light which extends across the filter at a position along the filter length which is dependent on the wavelength. Predetermined portions of the line of light are transmitted through or blocked by a position encoding mask to transmit, for different position intervals along the filter length, unique combinations of portions of the line of light to light detectors which are activated in response to the light signal. The position intervals correspond to wavelength intervals within the bandwidth passed by the filter and the resolution R of such a device is given by the formula $2^N-1$, where N is the number of output detectors and R is the number of elements, i.e., wavelength intervals, into which the bandwidth is resolved. The detectors provide binary outputs in the form of two level signals, i.e., a 1 or a 0, which are used to activate corresponding lights in the presence of a binary 1 signal to provide an immediate readout. The two level signals may be otherwise read or processed digitally.

Figure 1:
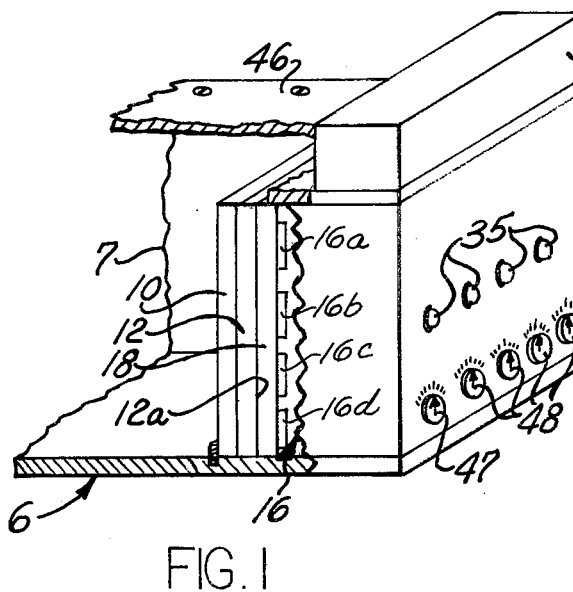
FIG. 1 is a perspective view, partially cut away, of a measuring device embodying the preferred embodiment of the present invention.

A specific embodiment of the preferred form of the present invention is illustrated in FIG. 1 and comprises a tube or housing 6, preferably rectangular in cross section, which has an open end 7 for receiving the monochromatic light whose wavelength is to be measured. The light entering the tube 6 is tramsmitted by an order filter 10 and an interference wedge filter 12 immediately behind the order filter 10 and exits from the rear face 12a of the wedge filter to form on code mask 18, a line of light 19 at a position along the length of the filter which is dependent on the wavelength of the light; see FIG. 3. The length of tube 6 ahead of the order filter 10 acts as a collimator to cause the light rays to be approximately normal, within limits of the desired resolution, to the order filter and the wedge filter. If desired, the tube 6 may have collimating optics ahead of the order filter.

Figure 2:
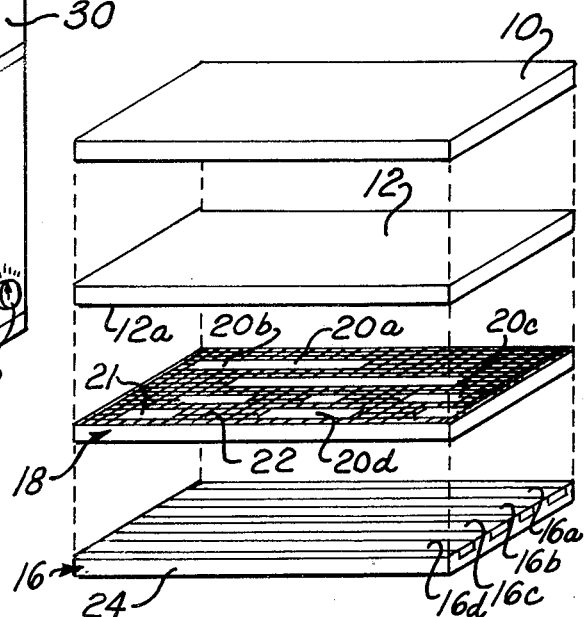
FIG. 2 is an exploded view of a portion of FIG. 1, indicating in a partly diagrammatic fashion, the position of the components constituting the processing means.
Figure 3:
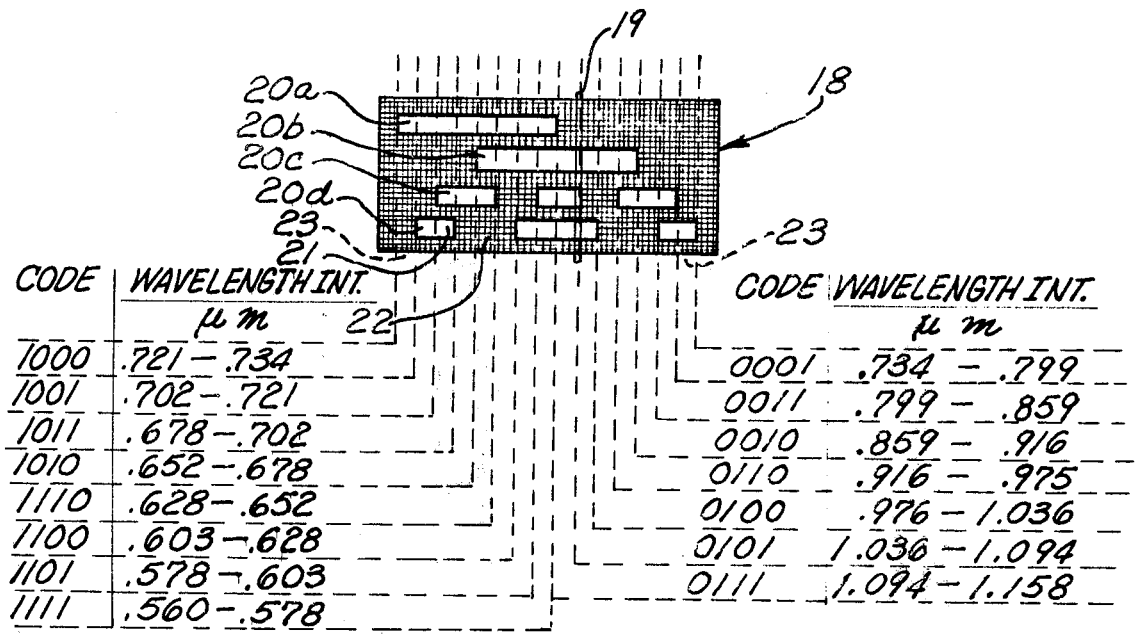
FIG. 3 is a view of the code mask used in the device of FIG. 1 and a table of wavelengths with their accompanying binary indications.
Figure 8:
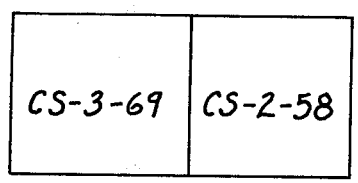
FIG. 8 is a view much like FIG. 3, but showing the use of two colored glass filters as an order filter.

As is therefore to be seen from FIG. 3, a position encoding means for the line of light 19 in the form of a binary code mask 18 is disposed immediately behind the interference wedge filter 12. The mask encodes the position of the line of light along the filter length and selectively transmits to or blocks portions of the line of light to a detecting means 16 located immediately behind the code mask 18. The detecting means 16 comprises a plurality of detectors 16a, 16b, 16c, 16d, see FIG. 2.

The interference wedge filter 12 may be a commercially available Fabry-Perot thin film interference wedge filter whose transmission characteristics for light vary along the length of the filter and are such as to efficiently pass within a bandwidth a very narrow band of frequencies at each location along the length of the filter. For example, as one proceeds along the length of the filter, such as from left to right as seen in FIG. 2, the center wavelength of the light efficiently transmitted by the filter changes. Each location, however, along the length of the filter does not pass only one wavelength but will pass one wavelength in each of different orders. However, it will only pass a very narrow range of frequencies, i.e., essentially a single wavelength, within a given bandwidth. Consequently, the order filter 10 is used to restrict the light applied to the wedge filter 12 to a band of wavelengths such that each location will essentially pass a unique wavelength of the wavelength band transmitted by the order filter 10.

From the foregoing, it will now be understood that when a light signal enters the light processing means and is applied to the order filter 10, if the light is within the order passed by the order filter 10, a line of light will emerge from exit side 12a of the wedge filter 12 at a position along its length which is a function of the wavelength of the light. Portions of the line of light passing from the exit side 12a of the wedge filter are selectively transmitted through the code mask 18 to a unique combination of a plurality of output detectors 16a, 16b, 16c, 16d of the detecting means 16, as seen in FIG. 2. The code mask serves to encode the position of the line of light and to tramsmit selected portions thereof to a unique combination of output detectors. The particular combination of the output detectors 16 energized is of course determined by the code in the code mask 18.

As is best shown in FIG. 3, code mask 18 comprises a plurality of binary code channels 20a, 20b, 20c, 20d which extend lengthwise of the interference filter 12 so that they are disposed perpendicular to the line of light 19 exiting from the exit face 12a of the interference wedge filter. Each binary channel is divided into transparent and opaque sections 21, 22, respectively, to cause the light exiting from the wedge filter to be selectively transmitted or blocked by the channel depending upon the position of the line of light along the length of the wedge filter. Each channel, therefore, provides a binary 1 or binary 0 signal and the four channels provide a binary code which is capable of resolving the length of the interference filter into fifteen subdivisions, i.e., wavelength intervals, as illustrated in FIG. 3. The intervals or segments have been designated in FIG. 3 by the reference numeral 23. Also, in FIG. 3, the dashed dividing lines for the intervals 23 have been extended to form a table which indicates the binary notation for the interval and an example of the wavelength for which the light line will fall within the given interval, as will be explained in more detail hereinafter.

In the illustrated embodiment, the mask is a modified Gray code mask and the channels 20a, 20b are opaque except for a single transparent area in each band which transmits a portion of the band which is one-half the bandwidth. The transparent portions 21 in channels 20a, 20b are phase-displaced from each other. The channels 20c, 20d each have three transparent sections 21 with the sections being phase-displaced from each other with two of the transparent sections in each channel extending over two resolution intervals and the third over three resolution intervals. The mask enables a resolution (R) of the bandwidth into $2^N-1$ subdivisions, where N is equal to the number of channels. In the specific embodiment illustrated in FIG. 3, N is four, since there are four channels (20a, 20b, 20c and 20d) which enable the apparatus to discriminate between fifteen different wavelength intervals falling within the bandwidth passed by the order filter 10 and the interference wedge filter. A Gray code mask is used because it has a maximum ambiguity of one bit at the code divisions.

Figure 9:
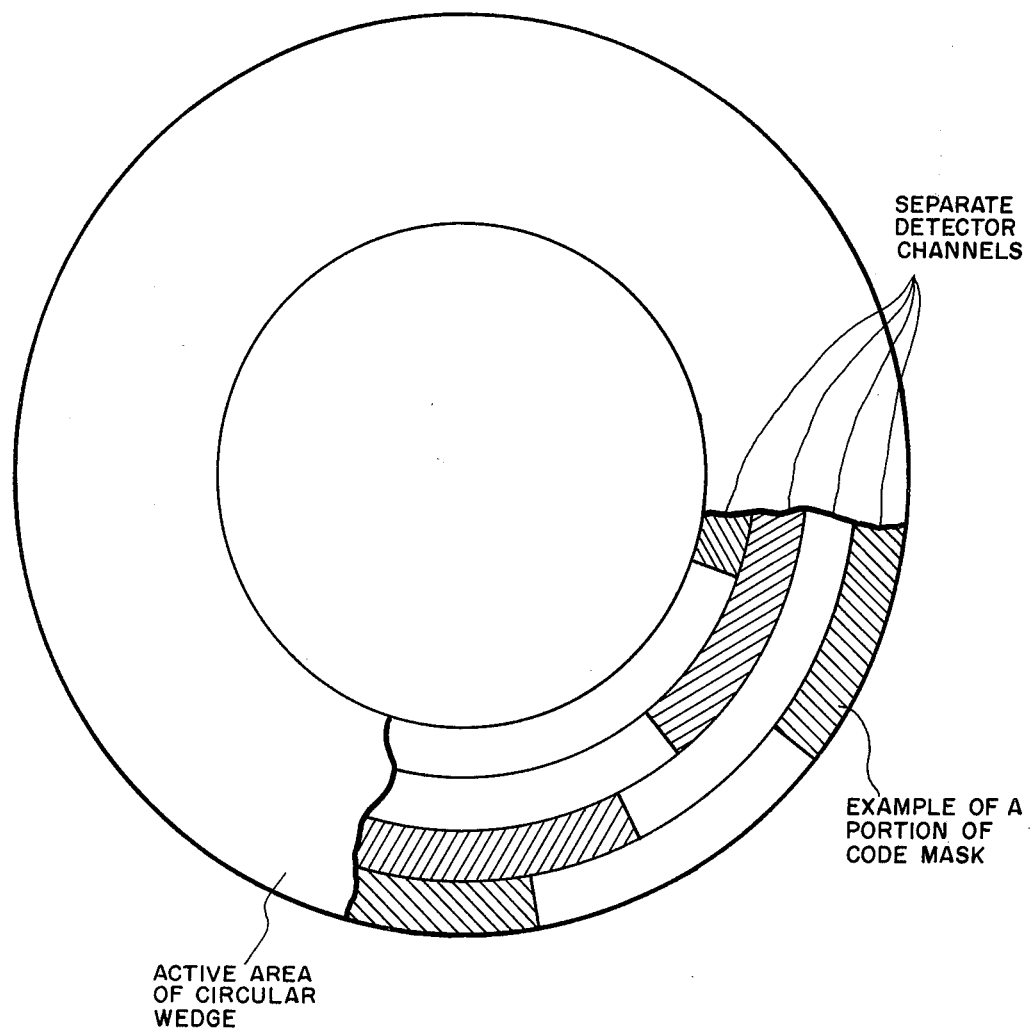
FIG. 9 is a circular code mask in accordance with my invention.

Although I have described the processing means as utilizing an interference wedge filter and code mask that are substantially rectangular, it is to be understood that these could obviously be of other configuration. For example, both the interference wedge filter and the code mask could be circular. In that instance, the interference wedge filter would provide a radially-disposed line of light, appearing at an angular location determined by the wavelength of the light, with the code mask having say four channels in the form of annular rings, and for example, 15 sectors; note FIG. 9. Thus, the information represented by the position of the line of light can be transmitted to a unique combination of detectors, thus indicating its angular position and hence its wavelength.

The detecting means also includes means for indicating the ones of the detectors 16a ... 16d which are activated. As noted above, the light transmitted by each of the channels is detected by a corresponding one of the detectors 16a, 16b, 16c, and 16d, see FIGS. 2 and 4. The detectors 16a, 16b, 16c, 16d are silicon-detectors on a plate 24 which function and act as photodiodes when activated by light and provide signals which are amplified by respective amplifiers 25a, 25b, 25c, 25d to activate threshold circuits 26a, 26b, 26c, 26d, respectively. The thresholds essentially compare the outputs of amplifiers 25a ... 25d with a reference and reduce the chance that the device will respond to normal background light or electronic noise.

When the threshold circuits are activated, they provide logic 1 signals on corresponding outputs 16a1, 26b1, 26c1, 26d1 which are connected to one input of a corresponding AND gate 27a, 27b, 27c, 27d, each of which has an output connected to activate a corresponding indicating circuit 29a, 29b, 29c, 29d. The amplifiers 25a ... 25d, the thresholds 26a ... 26d, and the AND gates 27a ... 27d may be integrated circuits on the side of plate 23 opposite the detectors 16a ... 16b.

The illustrated embodiment is particularly useful in measuring pulses of laser light whose presence can readily be distinguished from background light by a high sensitivity detector 30 mounted on the tube 6 but whose input is not reduced by order filters for the laser light. The AND gates 27a, 27b, 27c, 27d pass signals from the threshold circuits 26a, 26b, 26c, 26d when they also receive a signal from a threshold circuit 31 which is connected to the output of the light detector 30. The light detector 30 will detect the presence of a pulse of light to be measured and render, via the threshold circuit 31, the AND gates 27a ... 27b effective to pass any signals. The threshold circuit 31 is set at a level such that background noise will not activate the threshold circuit 31 to supply a signal to the AND gates 27a ... 27d.

Since the threshold 31 for detector 30 can be set at a relatively high level in view of the sensitivity of detector 30, the use of the detector 30, threshold 31 and the AND gates 27a ... 27d will allow the thresholds 26a ... 26d to be set at a lower, more sensitive level since the detector 30 and threshold 31 and AND gates 27a ... 27d will minimize false indication due to noise. It will be understood that the detector 30, threshold 31 and AND gates 27a ... 27d would not be particularly advantageous in a background noise-limited situation.

Figure 4:
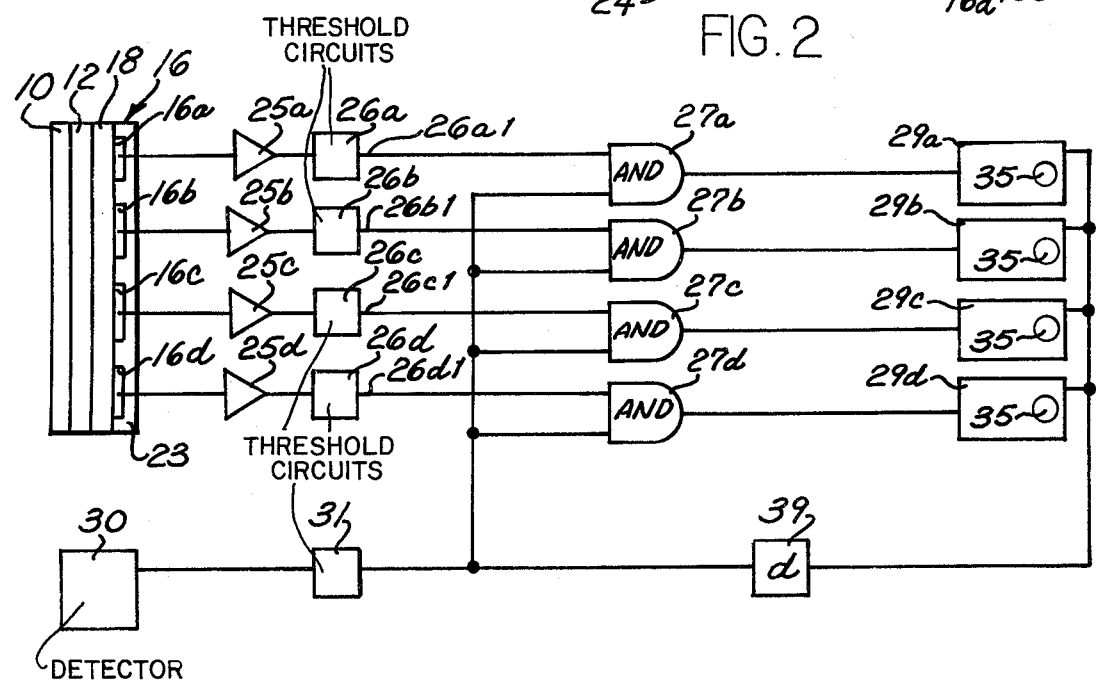
FIG. 4 is a schematic circuit diagram of the circuit used with the device of FIG. 1.
Figure 5:
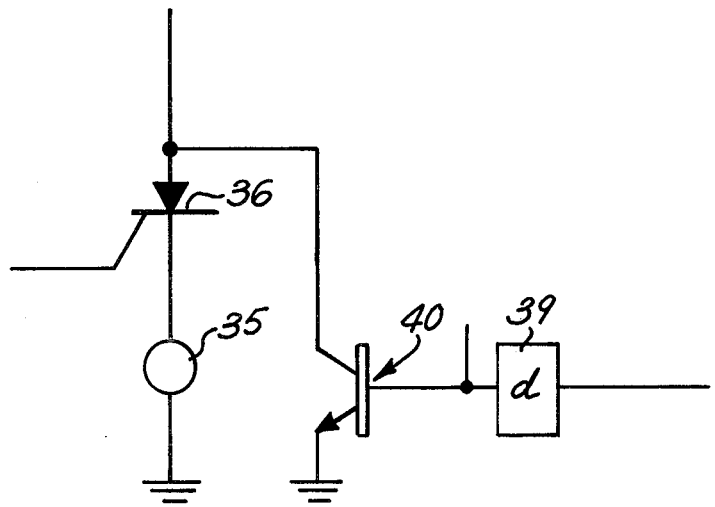
FIG. 5 is a simplified version of a reset circuit that may be utilized in the device according to the present invention.

The indicating means for each channel of the detecting means may, as illustrated in FIGS. 4 and 5, simply comprise a light-emitting diode 35. FIG. 5 reveals that device 35 may be energized through an SCR 36 which is triggered on in response to the output of the corresponding one of the AND gates 27a, 27b, 27c, and 27d. Such circuits may be reset before each reading and this may be done by removing the anode-to-cathode voltage drop in response to the switching of the threshold circuit 31 or by other timing circuitry, or by a manual reset switch. The indicating diodes 35 thus serve as a readout means, and as illustrated in FIG. 1, may be mounted on a rear plate closing the rear end of tube or housing 6.

FIG. 5 illustrates a circuit which can be used to reset the indicator. The threshold circuit 31 (FIG. 4) has been indicated as having a pulse output which is connected through a differentiating circuit 39 to switch on a transistor 40 for connecting the anode of an SCR 36 for energizing diode 35 to ground to turn off the SCR and extinguish the light-emitting diode. The transistor 40 is on only for a brief period after which the SCR will be rendered conductive or not by the output of the corresponding one of the threshold circuits 26a, 26b, 26c, 26d connected to the gate of the SCR.

The resolution possible with an interference wedge filter is in part dependent on the angle of light, since the transmission properties of the interference filter depend upon the incident angle of the incoming light. The incident angle should be constrained to lie within 10° of the normal, when using four detectors, in order to eliminate the possibility of false flase wavelength reading. These limitations will vary, depending on the resolution of the specific system. It will be apparent to those skilled in the art that if, say three detectors are used instead of four, the incident angle constraint can be somewhat relaxed, whereas if, say five detectors are used, the angle constraint would necessarily be more severe than mentioned above, inasmuch as the width of a wavelength resolution band would be diminished.

Preferably, the tube 6 has a removable top plate 46, with the various components disposed below this plate being removable. For example, a different order filter or a different code mask may be substituted. Thus, the user, in the first instance, can determine that the wavelength detected lies within one of the bands depicted in FIG. 3. Then, he can replace the present code mask with a compressed version covering only the bandwidth interval previously determined. He will then be able to establish the wavelength of the detected source to a resolution increased by a factor of 15. This procedure can be repeated as many times as desired to achieve great resolution, provided of course that the wedge filter is capable of this greater resolution.

It will further be understood that the device may include a reference level control knob 47, see FIG. 1, which controls a potentiometer that determines the level of the reference signal to thresholds 26a . . . 26d. Similarly, individual trim potentiometer controls 48 may be provided for each channel to control the reference signal for that channel.

Figure 6:
FIG. 6 is a front view of four light guides utilized in one embodiment of the present invention, with the filters and the code mask removed.
Figure 7:
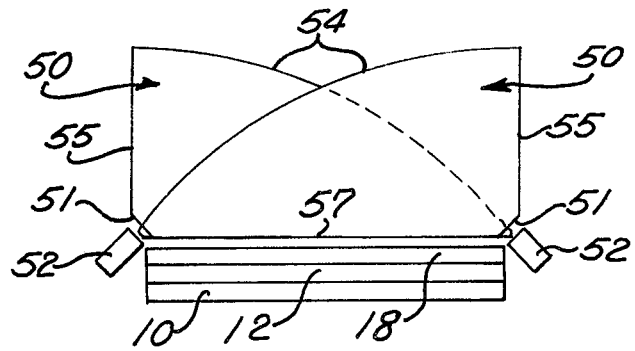
FIG. 7 is a top view of the light guides of FIG. 5, revealing their shape to be parabolic and illustrating their relationship to the filters and code mask.

FIGS. 6 and 7 illustrate a different type of detecting system for detecting whether or not light is transmitted through the code channel. In the embodiment of FIGS. 6 and 7, a respective disc-like parabolic light guide 50 for each channel receives the light from the associated channel of the code mask 18 and focuses it at a corresponding exit aperture 51. Light at the exit aperture of each guide is detected by a corresponding optical sensor 52. The optical sensors 52 operate in the same way as the detectors 16a, 16b, 16c, 16d of the first described embodiment to provide a digital readout for the wavelength.

Each of the guides 50 is a hollow member comprised of two spaced, parallel plate portions 53 joined by a curved edge portion 54 and a straight edge portion 55 and each have a straight open edge 57 which receives light from the respective channel. Each guide has a highly polished interior and is a segment of a parabola with a focus at the exit aperture 51 for the guide. The light guides 50 may be of material such as nickel and are preferably electro-formed on a polished mandrel.

One embodiment of the invention constructed with the light guides and detectors illustrated in FIGS. 6 and 7 employed two Corning colored glass filters CS-2-58 and CS-3-69 as an order filter 10, a Schott Veril S-60 interference wedge filter 12, a coding mask 18, as illustrated in FIG. 3, and a video amplifier for each channel. The threshold circuits, corresponding to the threshold circuits 26a, 26b, 26c, 26d, were Fairchill I.C. 711 dual comparators with only one side being used. In such comparators, an output signal is produced when the input to the comparator exceeds the level of a reference signal. The pulse from each of the comparators gated on a respective SCR to turn on a respective light-emitting diode which functioned as the indicating lamp. The binary readings shown in FIG. 3 correspond to the wavelengths shown in FIG. 3 and were obtained using the above elements.

It can be seen from the foregoing that the wavelength detection apparatus essentially has four output channels to which light is transmitted or not selectively, depending upon the wavelength of the light. The wedge filter 12 and the code mask 18 provide a light-processing means whose light-processing characteristics between the input and each of the output channels are dependent upon the wavelength of the light and, that within a given order of wavelengths, effect a transmission of light to a unique combination of the output channels for the number of resolution elements involved.

It will be appreciated that the present invention may utilize filters or other medium having transfer functions which can be controlled to pass signals having a physical characteristic within certain subdivisions of a bandwidth and to block the remainder to provide the resolving elements for energizing the output means for the apparatus. The invention contemplates the measurement of any characteristic where a signal can be transmitted as a function of its characteristic to predetermined ones of N output devices to energize different combinations of the devices for signal characteristics falling within different subdivisions into which the bandwidth of the device is to be resolved. By using code combinations of energized outputs, N output channels or devices can be used to resolve the bandwidth into $2^N-1$ subdivisions. Moreover, it will be recognized that the resolution is not restricted to equally spaced wavelength bands or bands of equal width.

It is not necessary that the device be constructed in such a way as to completely cover a given spectral region with equal width resolution bands. For example, if one wished only to distinguish between several distinct monochromatic sources, the mask 18 could be cut so as to transmit light to discrete combinations of detectors in only narrow bandwidths about the sources of interest. The present invention can be used to distinguish between a number of sources, S, such that S is the smallest integer satisfying $$N = \frac{\log (S+1)}{\log 2}$$

where N is the number of output channels and log is to any base.

It should now be apparent that I have provided a novel apparatus for providing a virtually instantaneous indication of the wavelength of incoming light, comprising an array of detectors activable by light, with each detector having a respective output. Processing means are utilized for receiving and transmitting to said detectors, the light whose wavelength is to be measured, with the processing means utilizing means for simultaneously and selectively transmitting or blocking light outputs to each of said detectors as a function of the wavelength of the light, thus to enable the detectors to reveal by the order and arrangement of their outputs, a coded indication of the wavelength of the incoming light.

The processing means can include in addition to an order filter, an interference wedge filter which passes incoming light as a line of light residing at a location on the filter dependent on the wavelength of the light, as well as a code mask usable in conjunction with the filter. The code mask serves to encode the position of the line of light and to transmit selected portions thereof to a unique combination of detectors of said detector array. The interference wedge filter and the code mask may be generally rectangular or alternatively may be circular in configuration.

It is to be understood that I am not to be limited to the foregoing embodiments of my invention, and for example, I can use a series of beam splitters instead of the above described processing means, whose transmissions are periodic functions of wavelength, so that light of a given wavelength is selectively reflected to a unique combination of detectors.

Figure 10:
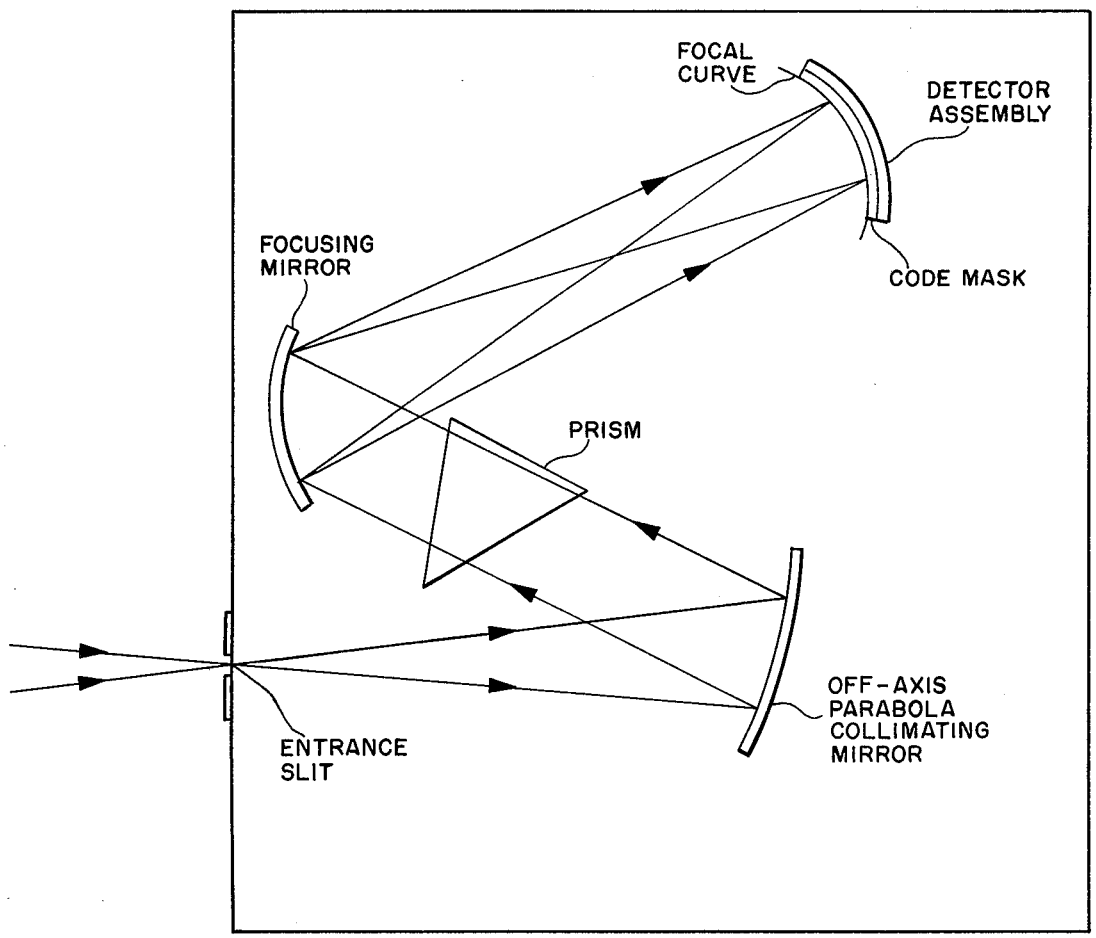
FIG. 10 is a prism spectrometer in accordance with my invention.
Figure 11:
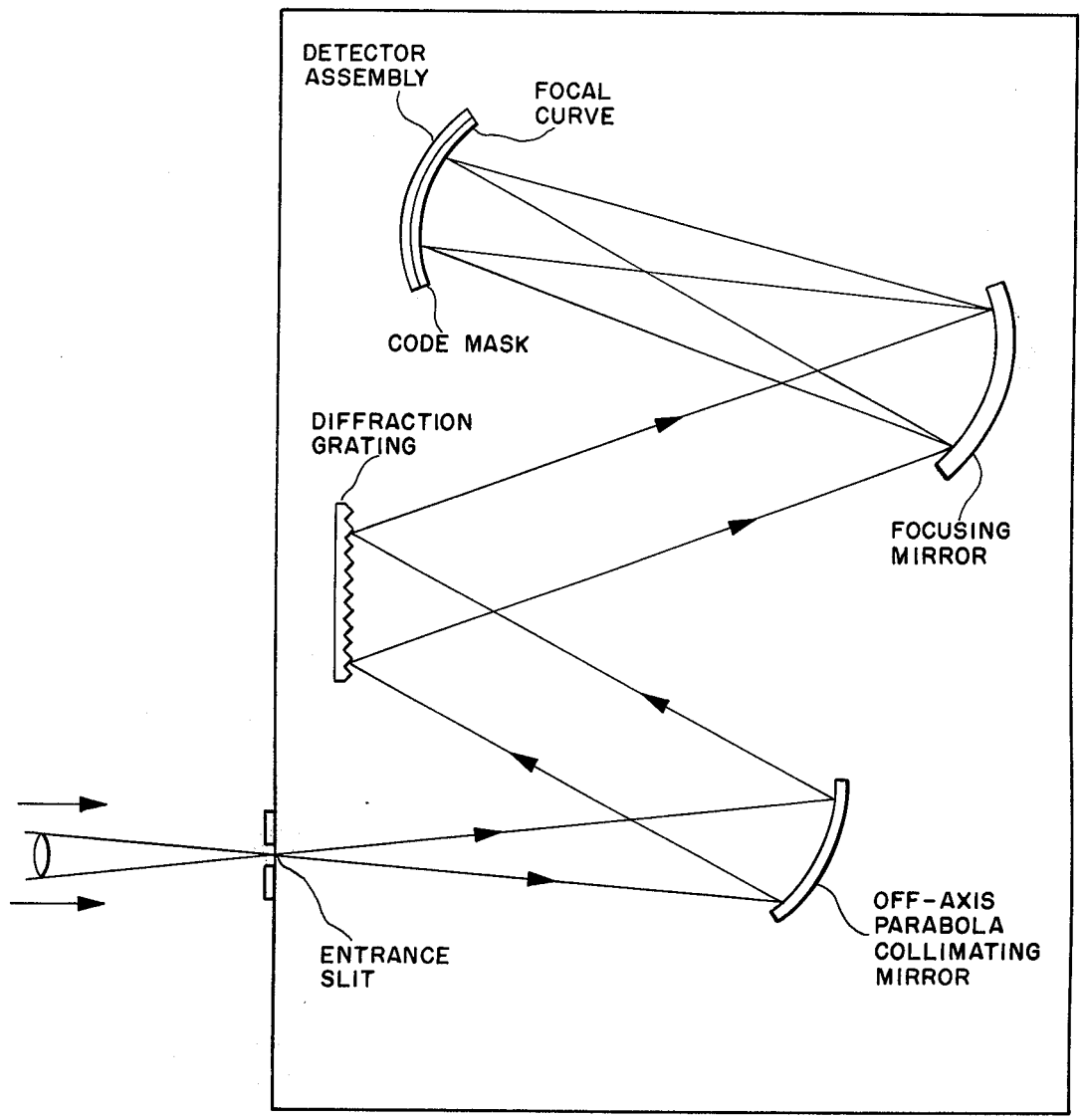
FIG. 11 is a grating spectrometer in accordance with my invention.

Another embodiment of my invention can involve the use of a prism spectrometer or a grating spectrometer as a dispersive element to present a focused image of the entrance slit on the focal plane at a position which is a function of wavelength. Note FIGS. 10 and 11. A code mask is then located on the focal plane which selectively transmits portions of that line of light to detectors in the general manner previously described.

Still another embodiment of my invention can involve the utilization of a series of detectors, each with its own filter. These filters are individualized so that each has its own transfer function, comparable of course to the transfer function of a single channel consisting of an interference wedge filter and a code mask of the embodiment set forth in conjunction with FIGS. 1 through 4. Thus, the filters are responsible for selectively transmitting light to the respective detectors, with the result that light of a given wavelength entering the device will be detected by a unique combination of detectors.

I claim:

1. Apparatus for providing a virtually instantaneous indication of the wavelength of incoming light, comprising an array of detectors activable by light, said detectors having respective outputs and being disposed in an order arrangement, said detectors revealing by virtue of the order and arrangement of their outputs, a coded indication of the wavelength of the incoming light, and processing means for receiving and transmitting to said detectors, the light whose wavelength is to be measured, said means comprising means for simultaneously and selectively transmitting or blocking light inputs to each of said detectors as a function of the wavelength of the light, thus to enable said detectors to reveal a coded indication of the wavelength of the incoming light.

2. Apparatus for providing a virtually instantaneous indication of the wavelength of incoming light, comprising an array of detectors activable by light, with each detector having a respective output, and processing means for receiving and tramsmitting to said detectors, the light whose wavelength is to be measured, said means comprising means for simultaneously and selectively transmitting or blocking light inputs to each of said detectors as a function of the wavelength of the light, thus to enable said detectors to reveal by the order and arrangement of their outputs, a coded indication of the wavelength of the incoming light, said processing means comprising an interference wedge filter which passes incoming light as a line of light residing at a location on the filter dependent on the wavelength of the light, and a code mask usable in conjunction with said filter, said code mask serving to encode the position of the line of light and to transmit selected portions thereof to a unique combination of detectors of said detector array.

3. The apparatus as defined in claim 2 in which said interference wedge filter and said code mask are substantially rectangular in configuration.

4. The apparatus as defined in claim 2 in which said interference wedge filter and said code mask are substantially circular in configuration.

5. The apparatus as defined in claim 1 in which a prism spectrometer is used in conjunction with a code mask to form a part of said processing means.

6. The apparatus as defined in claim 1 in which a grating spectrometer is used in conjunction with a code mask to form a part of said processing means.

7. The apparatus as defined in claim 1 in which said processing means takes the form of individual filters for each detector of said array of detectors, each of said filters having its individual wavelength transfer function such that light of a given wavelength is transmitted and detected by a unique combination of detectors.

8. In an apparatus for determining the wavelength of light, detecting means comprising an array of detectors, each of which is activable by light to produce an output, and processing means for receiving and transmitting to said detectors, the light whose wavelength is to be measured, said processing means comprising means for selectively transmitting or blocking light inputs to each of said detectors as a function of the wavelength of the incoming light, thereby to transmit unique combinations of inputs to said detectors for different wavelengths, and thus control the outputs of said detector array so that a virtually instantaneous readout as to the wavelength of the incoming light is provided.

9. In an apparatus as defined in claim 8 wherein said means for selectively transmitting or blocking light comprises means for forming a line of light in response to an input at a position along a path which is a function of the wavelength of the light to be measured, and coding means for selectively transmitting or blocking portions of said line of light to said detectors.

10. An apparatus as defined in claim 9 wherein said coding means comprises a binary mask having a plurality of binary code channels extending perpendicular to said line of light.

11. In an apparatus as defined in claim 9 wherein said means for forming a line of light comprises a wedge interference filter.

12. An apparatus as defined in claim 11 wherein said coding means comprises a binary mask having a plurality of binary code channels extending perpendicular to said line of light.

13. In an apparatus according to claim 8 in which said detectors each have an electrical output which varies in response to the amount of light activating the corresponding detector, said detecting means further comprising a plurality of threshold circuits each connected to the output of a respective one of said detectors to provide a first output signal when the light activating the corresponding detector is above a predetermined level, and a different output signal when the light is less than said predetermined level.

14. In an apparatus according to claim 13 wherein the apparatus further comprises output means responsive to the output signals from said threshold circuits to indicate the conditions of said detectors including circuit means having a first state for preventing said output means from responding to the output signals from said threshold circuits and activable to a second state enabling said output means to respond to said output signals, and light detecting means for detecting the presence of light of the type to be measured for activating said circuit means to its said second state.

15. In an apparatus as defined in claim 8 wherein a plurality of channels are utilized, one channel being associated with each detector, said detecting means comprising a plurality of light guides, one for receiving light from each of said channels, said light guides each comprising a light reflecting element of a configuration to focus light from said channel at a detecting location.

16. In an apparatus as defined in claim 15 wherein said light guides are each spaced polished plates extending perpendicularly to said mask and defining an aperture between edges of said plates to receive light from the corresponding channel, and a curved edge joining said plates to focus light from said channel at a detecting location.

17. In an apparatus as defined in claim 16 wherein said edge of each of said guides extends along a segment of a parabola having its focus at said detecting location.

18. In an apparatus for measuring the wavelength of a short pulse of monochromatic laser light, an order filter for receiving and transmitting a light pulse within a predetermined wavelength band, means for resolving said wavelength band into a plurality of wavelength intervals comprising a wedge interference filter for receiving light transmitted by said order filter and transmitting the light to provide a line of light at a position along the length of the filter dependent on the wavelength of the light, and an encoding mask adjacent said filter for resolving the length of the filter into intervals corresponding to said wavelength intervals, said mask receiving said line of light and selectively transmitting or blocking predetermined portions of said line of light to tramsmit a unique combination of said portions for each of said plurality of wavelength intervals within said band, and detecting means including a plurality of detectors, one for each of said portions of said line of light and activable by light to detect the transmission of the corresponding portion of the line of light by the encoding means and means for indicating the activated ones of said detectors.

19. In an apparatus as defined in claim 18 wherein said apparatus includes high sensitivity light detecting means for rendering said detecting means effective to indicate the activated ones of said detectors only in response to detection of a predetermined light signal.

20. In an apparatus for determining the wavelength of light, first means for receiving and transmitting the light whose wavelength is to be measured, and a plurality of detectors, said first means comprising means for selectively transmitting or blocking light to each of said detectors as a function of the wavelength of the light, to transmit unique combinations of inputs to said detectors for different wavelengths.

21. In an apparatus as defined in claim 20 wherein said means for selectively transmitting or blocking light comprises means for forming a line of light in response to an input at a position along a path which is a function of the wavelength; and coding means for receiving said line of light and selectively transmitting or blocking said line of light to said detectors.

22. An apparatus as defined in claim 21 wherein said coding means comprises a binary mask having a plurality of binary code channels extending perpendicular to said line of light.

* * * * *